United States Patent
Shin et al.

(10) Patent No.: US 7,613,165 B2
(45) Date of Patent: Nov. 3, 2009

(54) METHOD FOR SELECTING BROADCAST ROUTING PATH USING GENETIC ALGORITHM IN AD-HOC NETWORK

(75) Inventors: Hyun Soon Shin, Daejeon (KR); Hyun Moon Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 549 days.

(21) Appl. No.: 11/633,826

(22) Filed: Dec. 5, 2006

(65) Prior Publication Data

US 2007/0133504 A1    Jun. 14, 2007

(30) Foreign Application Priority Data

Dec. 5, 2005    (KR) ............... 10-2005-0117742

(51) Int. Cl.
*H04L 12/28* (2006.01)
(52) U.S. Cl. ................... 370/351; 370/254
(58) Field of Classification Search ............ None
See application file for complete search history.

(56) References Cited

U.S. PATENT DOCUMENTS 6,912,207 B2 *   6/2005   Ohnishi et al. ............ 370/255
7,542,426 B1 *   6/2009   Connors et al. ............ 370/238

FOREIGN PATENT DOCUMENTS

KR    10-2005-0023372    3/2005
KR    10-2005-0077340    8/2005
WO    WO 02-23832       3/2002

OTHER PUBLICATIONS

Abhishek Roy, Sajal K. Das, "QM2RP: a QoS-based mobile multicast routing protocol using multi-objective genetic algorithm", Wireless Networks, v.10, p. 271-286, May 2004.*
Wieselthier, J., et al., "On the Construction of Energy-Efficient Broadcast and Multicast Trees in Wireless Networks."

* cited by examiner

*Primary Examiner*—Jayanti K Patel
*Assistant Examiner*—Matthew Campbell
(74) *Attorney, Agent, or Firm*—Ladas & Parry LLP

(57) ABSTRACT

Provided is a method for selecting a broadcast routing path using a genetic algorithm in an Ad-hoc network. In the method, a plurality of nodes of the Ad-hoc network is defined as one chromosome, and the chromosome is represented with pairs of {order, power} in each node. Child nodes are created by performing an order based crossover and a power based crossover with respect to parent nodes neighboring to a source node. A mutation operation is performed with respect to the parent nodes and the child nodes. Relay nodes are determined by converting order and power information of each node of the chromosome into routing tree information. Power of the relay nodes is determined. A broadcast routing path is selected using the number and power of the relay nodes.

14 Claims, 7 Drawing Sheets

METHOD FOR SELECTING BROADCAST ROUTING PATH USING GENETIC ALGORITHM IN AD-HOC NETWORK

CLAIM OF PRIORITY

This application claims the benefit of Korean Patent Application No. 2005-0117742 filed on Dec. 5, 2005, in the Korean Intellectual Property Office, the disclosure of which is incorporated herein by reference.

BACKGROUND OF THE INVENTION

1. Field of the Invention

The present invention relates to a broadcast routing method in an Ad-hoc network, more particularly, to a method for selecting a broadcast routing path using a genetic algorithm in an Ad-hoc network, which can minimize the number of relay nodes and total power consumption in order for efficient data transmission in the Ad-hoc network.

2. Description of the Related Art

An Ad-hoc network is an infrastructure-free network that is configured freely by nodes. The Ad-hoc network does not require the infrastructure such as a base station or an access point for network configuration and maintenance. Ad-hoc nodes communicate one another through a wireless interface and can overcome limitation of communication distance of the wireless interface by using a multihop routing function. Also, because the Ad-hoc nodes can freely move, a network topology changes dynamically. Such an Ad-hoc network may be fully independent and may interface with an infrastructure network, such as Internet, through an Internet gateway. The Ad-hoc network can be applied to emergency rescue, urgent conference, military network, and so on.

In the Ad-hoc network in which different nodes communicate one another through a wireless link while moving freely, the nodes serve as a transmitter and a receiver. Therefore, an essential problem is how to perform a routing and a scheduling.

Because the link in the Ad-hoc network is wireless, one node can send a message to all neighbor nodes through one-time transmission. By using this characteristic in the broadcast, resource utilization efficiency can be improved. It can be realized by connecting all nodes of the network to the source node through a relay node. Therefore, a broadcast routing tree configuration is important for the efficient data transfer in the Ad-hoc network.

To solve the above-described problems, there is a demand for a broadcast routing method that can minimize network resource utilization in the Ad-hoc network. Many efforts have been made to solve the problems.

Conventional routing methods of an Ad-hoc network are disclosed in Korean Patent Application No. 2005-00007802 entitled "VIRTUAL LINK COST ROUTING TECHNOLOGY IN MOBILE AD-HOC NETWORKS" and Korean Patent Application No. 2004-00004953 entitled "APPARATUS AND METHOD FOR DATA TRANSMISSION PATH SETTING IN AD-HOC NETWORK." The former discloses an energy-based packet routing method for expanding an operating time of a mobile Ad-hoc network, and the latter discloses a method for setting a path having a minimum error in order for shortening a data transmission path. The two patent applications, however, do not teach a broadcast routing method for minimizing the number of relay nodes and total power consumption in order to efficiently use the resources during the broadcast routing in the Ad-hoc network.

SUMMARY OF THE INVENTION

The present invention provides a method for selecting a broadcast routing path using a genetic algorithm (GA) in an Ad-hoc network, which can minimize the number of relay nodes and total power consumption to maximally use the network resources during data transmission.

According to an aspect of the present invention, there is provided a method for selecting a broadcast routing path using a genetic algorithm in an Ad-hoc network having a plurality of nodes, including the steps of: a) defining a plurality of nodes of the Ad-hoc network as one chromosome, and representing the chromosome with pairs of {order, power} in each node; b) creating child nodes by performing an order based crossover and a power based crossover with respect to parent nodes neighboring to a source node; c) performing a mutation operation with respect to the parent nodes and the child nodes; d) determining relay nodes by converting order and power information of each node of the chromosome into routing tree information, and determining power of the relay nodes; and e) selecting a broadcast routing path using the number and power of the relay nodes.

The step a) may further include the steps of: connecting the nodes of the network to the source node directly or through the relay nodes in order for the broadcast routing; and setting a connection order of the nodes and power for data transmission.

Thee connection order is to connecting the nodes to the source node directly or through the relay nodes, and the power is energy that is necessary to receive data and transmit the received data in each of the nodes.

The step b) may include the steps of: b1) comparing transmission powers of first and second parent nodes neighboring to the source node, and selecting one parent node having a lower transmission power; b2) comparing transmission powers of third and fourth parent nodes neighboring to the source node, and selecting one parent node having a lower transmission power; and b3) creating first and second child nodes by mutation of the selected parent nodes.

The method may further include the steps of: when transmission power of the first child node is lower than or equal to transmission powers of the first and second parent nodes, determining the parent node having a lower transmission power and the first child node as a next generation pool of the parent nodes; when the transmission power of the first child node is greater than the transmission powers of the first and second parent nodes, determining the first and second parent nodes as a next generation pool; when transmission power of the second child node is lower than or equal to transmission powers of the third and fourth parent nodes, determining the parent node having a lower transmission power and the second child node as a next generation pool; and when the transmission power of the second child node is greater than the transmission powers of the third and fourth parent nodes, determining the third and fourth parent nodes as a next generation pool.

The step b3) may include the steps of: generating a value ranging from 0 to 1; and when the generated value is less than a preset first reference value (R_ORDERCROSSOVER (0.5)), performing an order-based partially matched crossover (PMX) on the two parent nodes to determine an order value of the first and second child nodes.

The step b3) may include the steps of: generating a value ranging from 0 to 1; and when the generated value is less than a preset second reference value (R_POWERCROSSOVER (0.5)), performing a power-based blend crossover (BLX) on the two parent nodes to determine a power value of the first and second child nodes.

The step c) may include the steps of: c1) changing an order by selecting a pair of nodes from the one chromosome; and c2) changing a real number generated from [0, maximum power value] into a power of the node by selecting one node from the one chromosome. The steps c1) and c2) may be performed independently. The step c1) may include the steps of: generating a value ranging from 0 to 1; and when the generated value is less than a preset third reference value R_ORDERMUTATION(0.001), performing an order based mutation operation on the parent nodes and the child nodes. The step c2) may include the steps of: generating a value ranging from 0 to 1; and when the generated value is less than a preset fourth reference value R_POWERMUTATION(0.5), performing a power based mutation operation on the parent nodes and the child nodes.

The step d) may include the steps of: d1) sorting the nodes contained in a set (C) of the nodes covered by power of the source node in ascending order; d2) when there are nodes that are not covered among neighbor nodes of the nodes, determining the corresponding nodes as relay nodes; d3) adding nodes covered by a relay operation of the determined relay nodes to the set (C); and repeating the steps d1) to d3) until all of the nodes of the chromosome are covered.

The step e) may include the steps of: e1) calculating number of the relay nodes and power consumption thereof according to the broadcast routing path; and selecting a broadcast routing path in which the number of the relay nodes and the power consumption thereof are minimum.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The present invention will now be described more fully hereinafter with reference to the accompanying drawings, in which preferred embodiments of the invention are shown.

Figure 1:
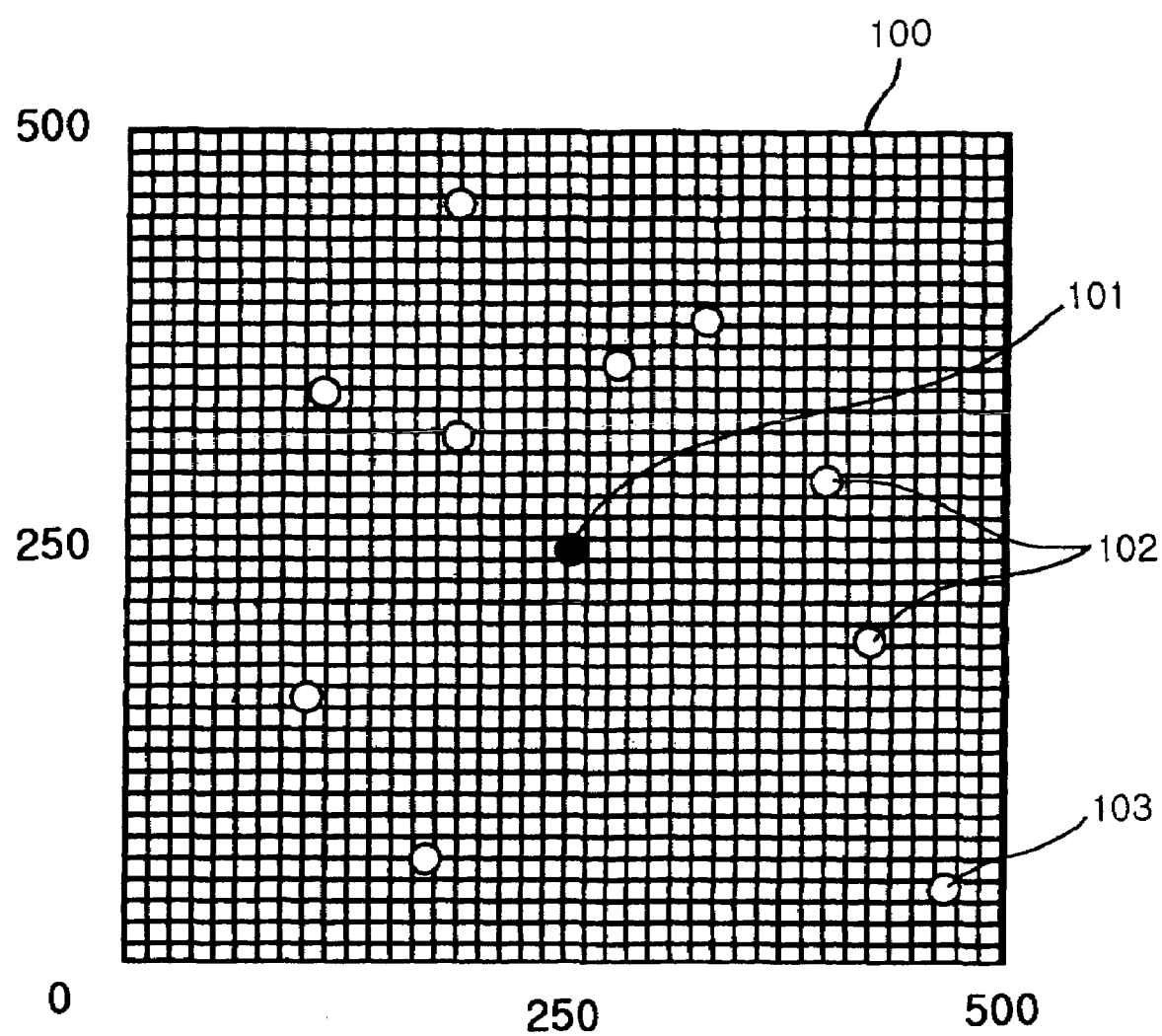
FIG. 1 illustrates a configuration of an Ad-hoc network according to an embodiment of the present invention.

FIG. 1 illustrates a configuration of an Ad-hoc network according to an embodiment of the present invention. Referring to FIG. 1, the Ad-hoc network 100 includes a plurality of nodes 101 to 103. The nodes may be a source node, a relay node, or a destination node. The Ad-hoc network illustrated in FIG. 1 includes one source node 101, a plurality of relay nodes 102, and a plurality of destination nodes 103. Although not shown in FIG. 1, the Ad-hoc network may further include at least one gateway for transmitting data from the nodes to other communication system (e.g., Internet network).

The source node 101 transmits data to the neighbor relay node 102, and the relay node 102 transmits the data to another relay node 102. Through these procedures, the data is finally transmitted to the destination node 103. That is, because the respective nodes transmit data to the neighbor nodes, the total power consumption is minimized. The power means the energy that is dissipated when each node receives data and transmits the data to another node. The relay node 102 serves to relay the data of other nodes.

Figure 2:
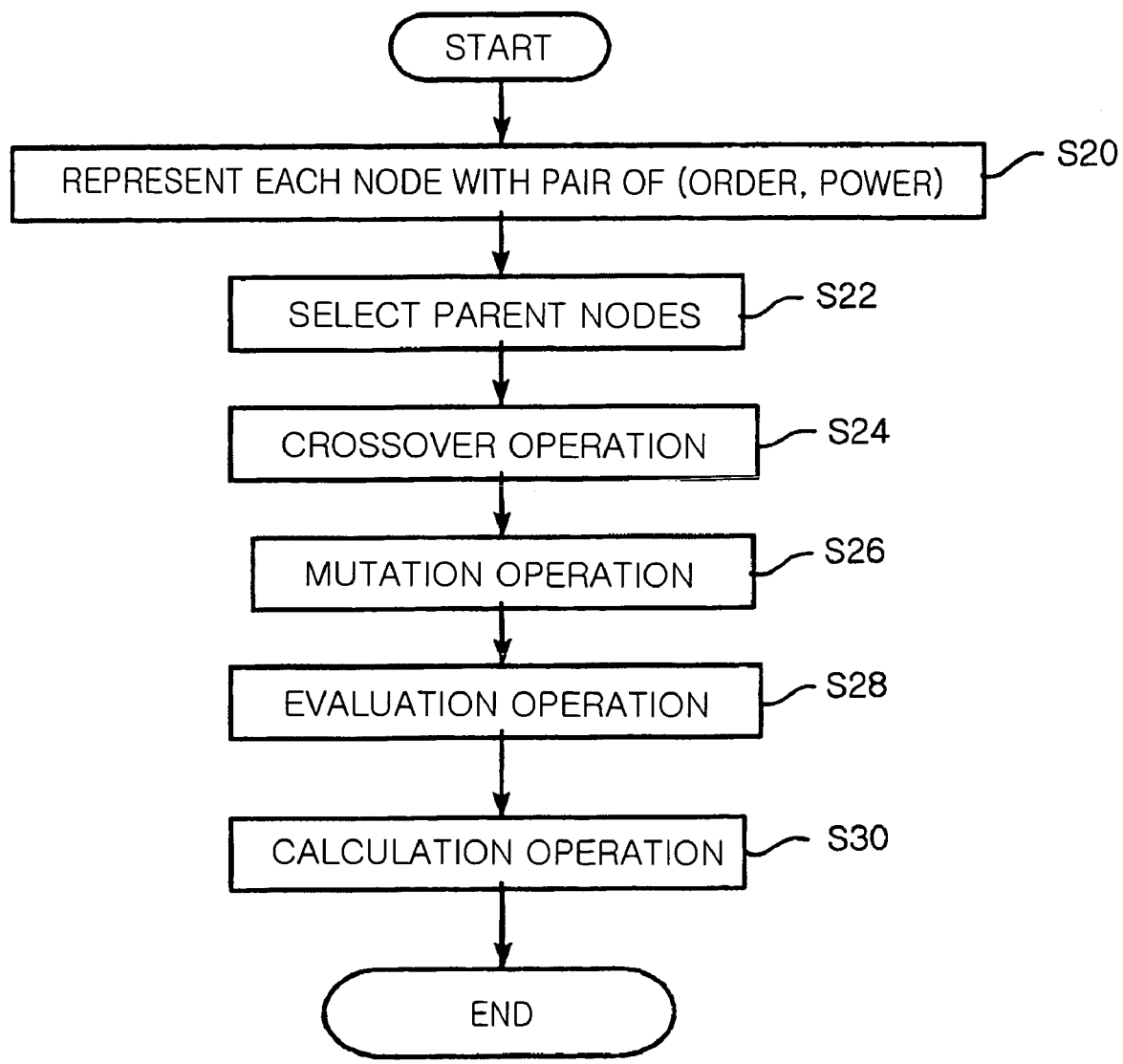
FIG. 2 is a flowchart of the genetic algorithm (GA) according to an embodiment of the present invention.

FIG. 2 is a flowchart of the genetic algorithm (GA) according to an embodiment of the present invention.

First, a genetic algorithm (GA) will now be described. An optimization has difficulty in finding a solution because of much non-linearity. In order to solve the optimization problem, various methods have been proposed. One of them is a genetic algorithm using an evolution mechanism of an organism. The genetic algorithm is a probabilistic optimal solution search technique imitating ecological evolution operation, that is, natural selection and law of inheritance. The genetic algorithm was first introduced in a paper entitled "Adaptation in Natural and Artificial Systems", J. Holland, 1975.

The genetic algorithm finds an optimal solution using the evolution principles of "survival of the fittest" and "natural selection". A basic solution is expressed as a chromosome that is an arrangement of numbers and symbols, called a gene, and creates an initial population. Then, an excellent solution is found through the evolution that creates a new population by a crossover and mutation, which are the selection and genetic operators. In the genetic algorithm, the representation of the solution may be expressed in various ways, e.g., binary number or real number, depending on the problems to be solved.

The genetic algorithm belongs to an artificial intelligence field that finds the suitable solution to a problem through the evolution. For example, one approach to a problem is one gene and several approaches (genes) are produced randomly. The produced approaches can know a relative suitability for the problem. Two most suitable approaches are selected and undergo the crossover operation and the mutation operation to create a new approach. Using the new approach, the optimal approach to the problem is found.

The crossover operator mixes the gene sequence between individuals. The evolution of the individual may occur due to the mutation (the probability is low), but it often occurs during the crossover operation of the individuals. In the genetic algorithm, the crossover includes two operations. One operation is to select one or more individuals for the crossover, and the other operation is to select a random position of the gene sequence and change the gene sequence between the individuals. Through these operations, the individuals adapted to the environment increase as the generation of the pool passes by.

The mutation operator changes a gene of the gene sequence and is used to overcome the limitation of the individual evolution through the crossover operation. However, if the mutation generation probability is set to too high, it may become a random search. Therefore, an appropriate mutation generation is required. Generally, it is preferable that the mutation generation probability is set to 0.01.

The present invention provides a method for optimally selecting a broadcast routing path using the genetic algorithm in an Ad-hoc network.

Referring to FIG. 2, the genetic algorithm includes a representation operation S20, a selection operation S22, a crossover operation S24, a mutation operation S26, an evaluation operation S28, and a calculation operation S30.

In step S20, each node of the Ad-hoc network is implemented with one node in order to search an optimal solution by operating a population consisting of a plurality of individuals. The solution of the problem to be solved is represented with individuals by pairing an order based genetic algorithm and a real number based genetic algorithm with respect to each node. That is, each node of the network is represented by pair of (order, power). In step S22, two parent nodes neighboring to the source node are selected from the nodes represented by chromosome. In step S24, child node is created from the parent nodes through the crossover operation that is the genetic algorithm operator. In step S26, the mutation operation is performed on the generated child node. In steps S28 and S30, in order to use the representation in the genetic algorithm, the information represented by the chromosome is converted into the broadcast routing information, the fitness of the individual is evaluated, and the solution is calculated.

Figure 3:
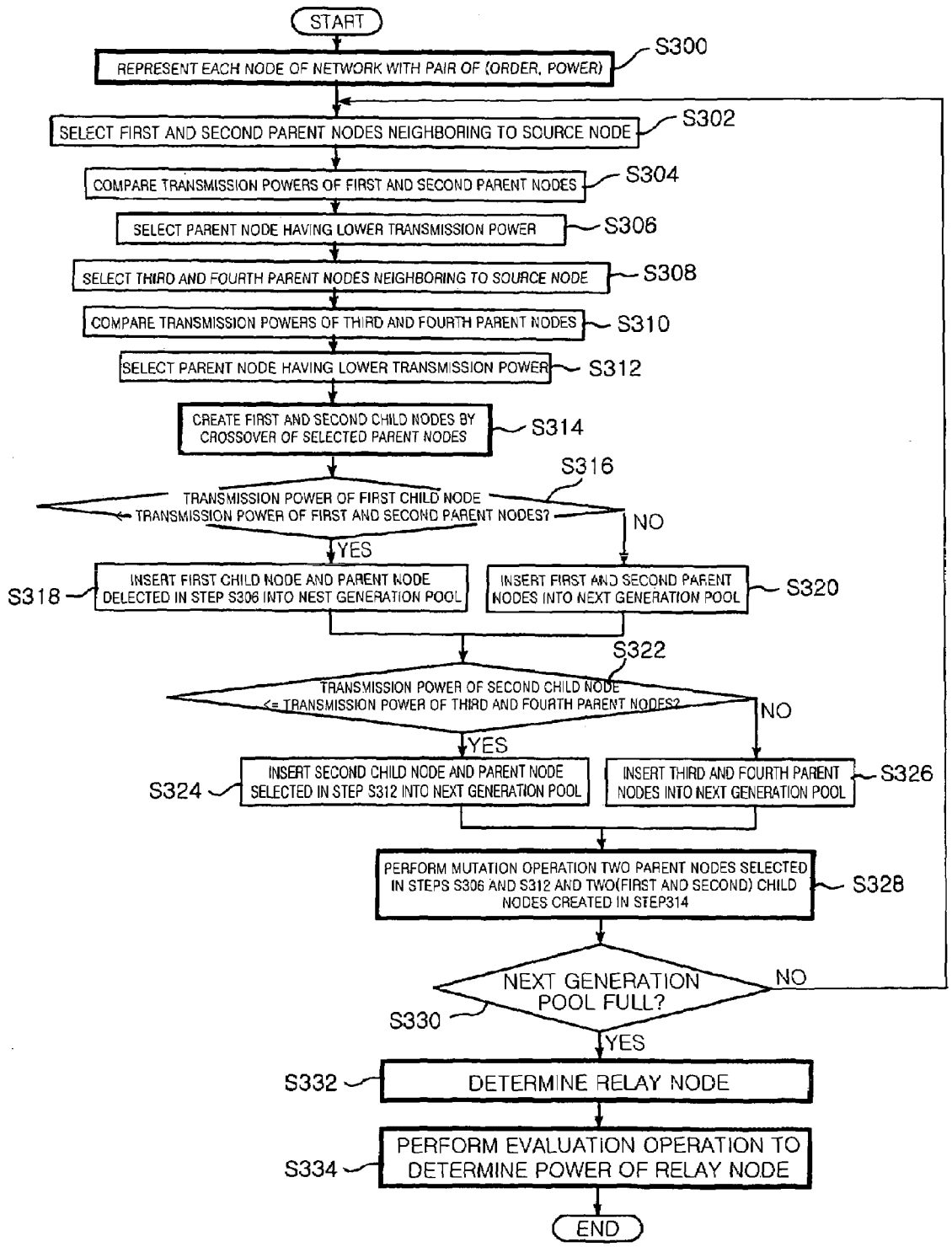
FIG. 3 is a flowchart illustrating a method for selecting a broadcast routing path using the genetic algorithm according to an embodiment of the present invention.

FIG. 3 is a flowchart illustrating a method for selecting a broadcast routing path using the genetic algorithm according to the present invention.

Referring to FIG. 3, the Ad-hoc network environment is built, and an order and transmission power of each node are represented by a pair (S300). More specifically, each node of the Ad-hoc network is set to pair of (order, transmission power) in a combination form of the order based genetic algorithm and the real number based genetic algorithm, and each node is represented by individuals. These individuals become the parent node and form one pool.

First and second parent nodes neighboring to the source node are selected (S302), the transmission powers of the first and second parent nodes are compared with each other (S304), and the parent node having the lower power is selected (S306). Third and fourth parent nodes neighboring to the source are selected (S308), the transmission powers of the third and fourth parent nodes are compared with each other (S310), and the parent node having the lower power is selected (S312).

First and second child nodes are created by the crossover of the parent node selected in step S306 and the parent node selected in step S312 (S314). The parent nodes and the child nodes can be represented by a tree structure. In the tree structure, the child node configures a next generation of the parent node.

It is determined if the transmission power of the first child node is lower than the transmission powers of the first and second parent nodes (S316). When the transmission of the first child node is lower than the transmission powers of the first and second parent nodes, the parent node having the lower transmission power and the first child node are inserted into a next generation pool (S318). If not, the first and second parent nodes are inserted into the next generation pool (S320). It is determined if the transmission power of the second child node is lower than the transmission powers of the third and fourth parent nodes (S322). When the transmission of the second child node is lower than the transmission powers of the third and fourth parent nodes, the parent node having the lower transmission power and the second child node are inserted into a next generation pool (S324). If not, the third and fourth parent nodes are inserted into the next generation pool (S326).

The mutation operation is performed on the four nodes stored in the next generation pool (S328). The four nodes stored in the next generation pool include the first child node, the parent node having the lower transmission power among the first and second parent nodes, the second child node, and the parent node having the lower transmission power among the third and fourth parent nodes. It is preferable that the mutation operation is performed on the parent node selected from the first and second parent nodes in step S306, the parent node selected from the third and fourth parent nodes in step S312, and the first and second child nodes generated in step S314. However, it does not mean that the mutation operation on the first to fourth parent nodes that can be stored in the next generation pool is excluded.

After steps S302 to S328, it is determined if the next generation pool is full (S330). When the next generation is full, a relay node for transmitting data is determined (S332). An evaluation operation for determining the power consumption of the relay node is performed (S334). If the next generation is not full, the process repeats steps S302 to S328 until the next generation pool is full.

The representation operation, the crossover operation, the mutation operation, and the evaluation operation will be described below in more detail with reference to FIGS. 4 through 7.

Figure 4:
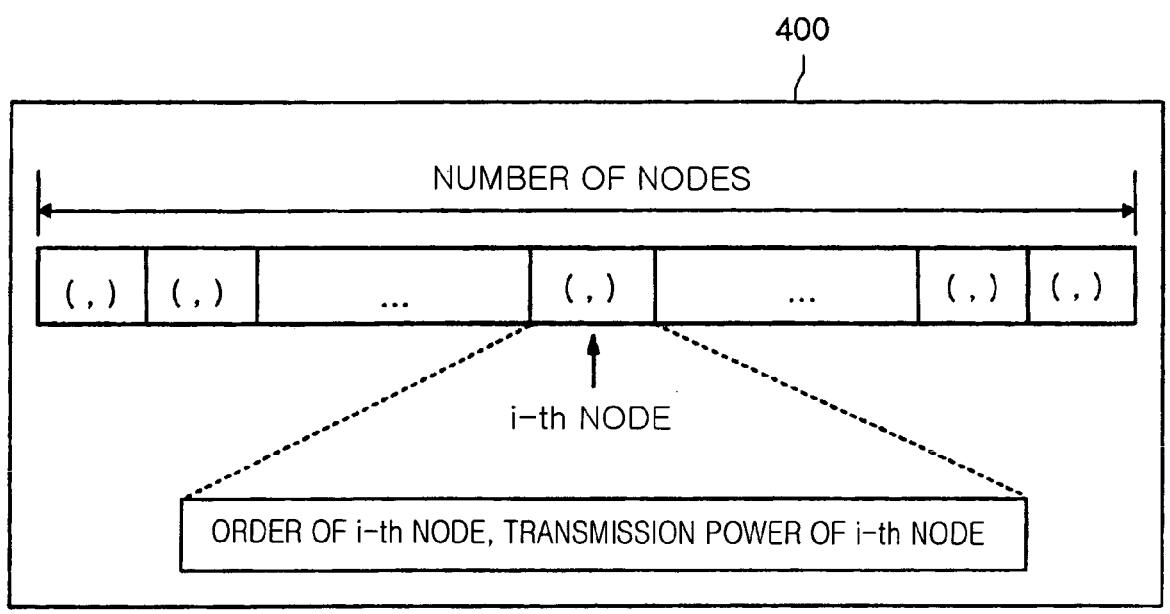
FIG. 4 is a flowchart of a representation operation in the genetic algorithm according to an embodiment of the present invention.

FIG. 4 is a flowchart of the representation operation in the genetic algorithm applied to the Ad-hoc network according to the present invention.

Referring to FIG. 4, each node of the Ad-hoc network is represented by one chromosome. When the number of nodes is "n", one chromosome includes n pairs, that is, n pairs of {order, power}. In order to express that all nodes of the network must be directly connected to the source node or connected through the relay node for the broadcast routing, an order numbering is performed on all nodes of the network and the nodes are represented by the pairs of the order and transmission power.

As illustrated in FIG. 4, the total number of the nodes is "n", and the order and transmission power of each node is represented by one pair. In this way, the entire nodes of the network are represented.

Figure 5:
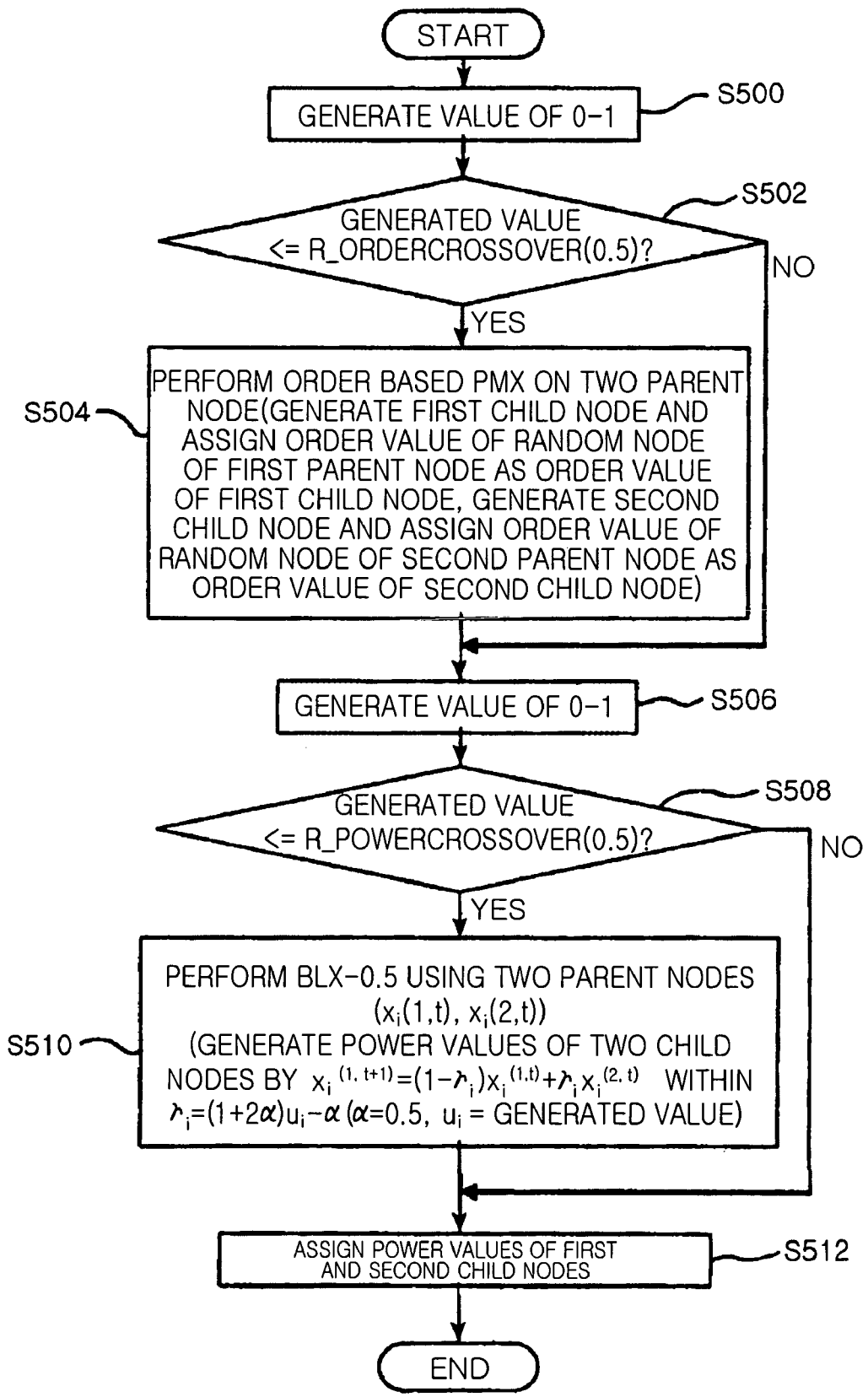
FIG. 5 is a flowchart of a crossover operation in the genetic algorithm according to an embodiment of the present invention.

FIG. 5 is a flowchart of the crossover operation in the genetic algorithm applied to the Ad-hoc network according to the present invention.

The crossover operation in the genetic algorithm creates two child nodes by the mutation of the selected two parent nodes. The crossover operation is divided into an order based crossover operation and a power based crossover operation. During the crossover operation, the order value and the transmission power value of the node are determined.

Referring to FIG. 5, when two parent nodes $(x_i^{(1,t)}, x_i^{(2,t)})$ are given, a random value of 0-1 is generated with respect to the order of the child nodes (S500). The generated value is compared with a preset value R_ORDERCROSSOVER($\alpha$)

(where α=0.5) (S502). When the generated value is less than or equal to the preset value R_ORDERCROSSOVER(0.5), a partially matched crossover (PMX) that is the order based crossover is performed using the two parent nodes ($x_i^{(1,t)}$, $x_i^{(2,t)}$) (S504). The first and second nodes are created through the crossover of the two parent nodes by the PMX operation. The order value of an arbitrary node of the first parent node is assigned as the order value of the first child node, and the order value of an arbitrary node of the second parent node is assigned as the order value of the second child node.

When two parent nodes ($x_i^{(1,t)}$, $x_i^{(2,t)}$) are given, a random value of 0-1 is generated with respect to the transmission power of the child nodes regardless of the PMX (S506). The generated value is compared with a preset value R_POWERCROSSOVER(α)(where α=0.5) (S508). When the generated value is less than or equal to the preset value R_POWERCROSSOVER(0.5), a blend crossover (BLX) that is the power based crossover) is performed using the two parent nodes ($x_i^{(1,t)}$, $x_i^{(2,t)}$) (S510). The BLX is performed on the two parent nodes ($x_i^{(1,t)}$, $x_i^{(2,t)}$) (where ($x_i^{(1,t)} < x_i^{(2,t)}$) using $x_i^{(1,t+1)} = (1-r_i)x_i^{(1,t)} + r_i x_i^{(2,t)}$ at $r_i = (1+2\alpha)u_i - \alpha - ((\text{where } ((=0.5, \text{ui=the generated value})) \text{ within the range of } [xi(1,t) - ((xi(2,t) - xi(1,t)), xi(2,t) + ((xi(2,t) - xi(1,t))]$. The power values of the two child nodes created from the two parent nodes by the BLX are generated.

Through these procedures, (order, power) pair of two child nodes, which are the next generation of the two parent nodes, are determined (S512).

Figure 6:
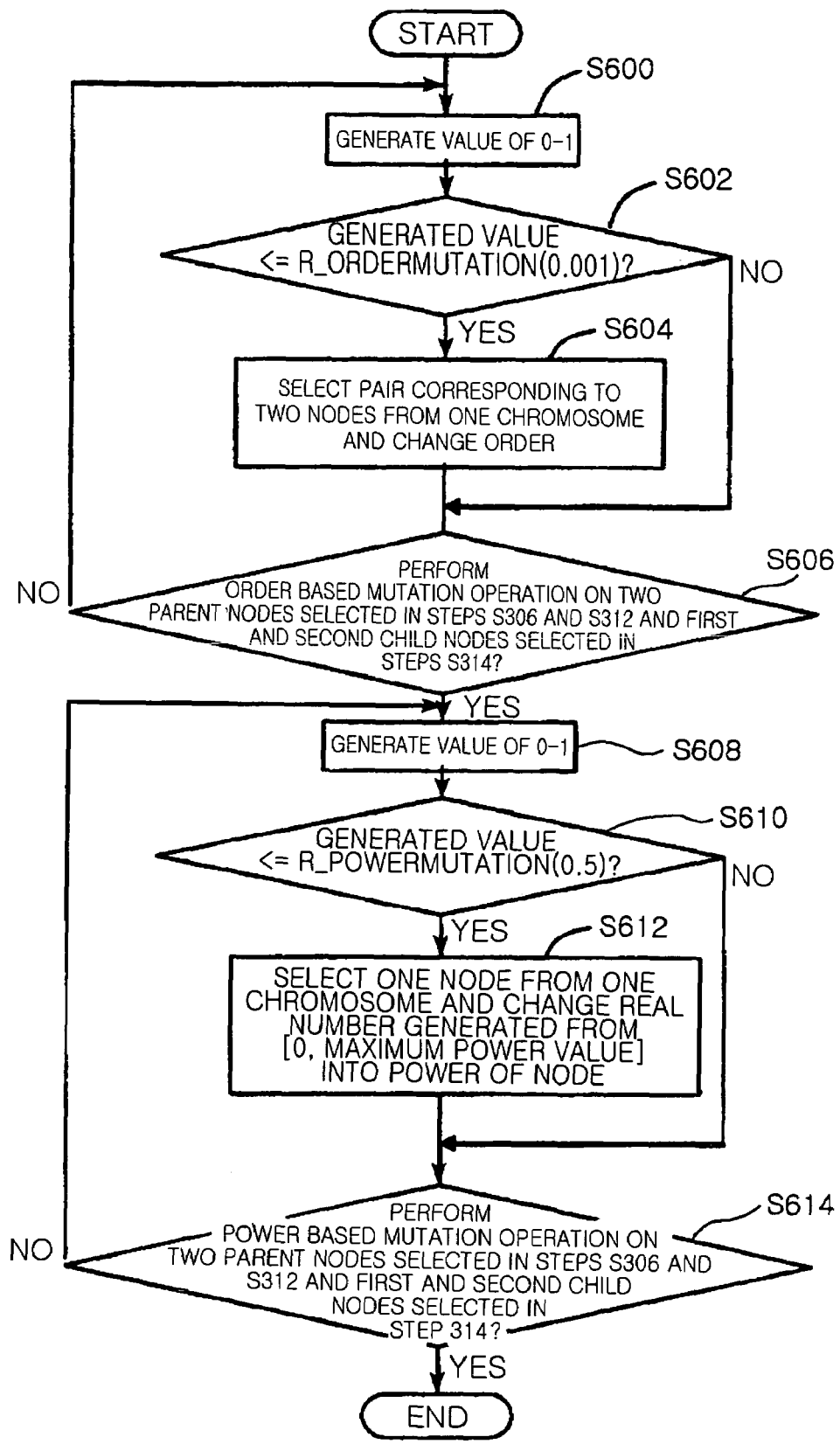
FIG. 6 is a flowchart of a mutation operation in the genetic algorithm according to an embodiment of the present invention.

FIG. 6 is a flowchart of the mutation operation in the genetic algorithm applied to the Ad-hoc network according to the present invention. The mutation operation is divided into an order based mutation operation and a power based mutation operation. The mutation operation changes the order value and the transmission power value of the nodes. A case of selecting a pair of two nodes from one chromosome and changing the order is defined as the order based mutation, and a case of selecting one node from one chromosome and changing a real number generated from [0, maximum power value] into a power of the corresponding node is defined as the power based mutation.

Referring to FIG. 6, each node of the Ad-hoc network is represented by one chromosome. When the number of nodes is "n", one chromosome is represented by n pairs of (order, power).

In order to perform the order based mutation operation, an arbitrary value of 0-1 is generated (S600). The generated value is compared with a preset value R_ORDERMUTATION(( ) (where (=0.001) (S602). When the generated value is less than or equal to the preset value R_ORDERMUTATION(0.001), two nodes are selected from one chromosome consisting of n nodes and their order is exchanged (S604). Then, the process proceeds to step S606. When the generated value is greater than the R_ORDERMUTATION(0.001), the process proceeds to step S606.

It is determined if the order based mutation operation is performed on the parent node selected from the first and second parent nodes in step S306, the parent node selected from the third and fourth parent nodes in step S312, and the first and second child nodes created in step S314 (S606). When it is determined that the order based mutation operation is performed on the two parent nodes and the two child nodes, the power based mutation operation is performed. When it is determined that the order based mutation operation is not performed, the process returns to step S600.

In the power based mutation operation, an arbitrary value of 0-1 is generated (S608), and the generated value is compared with the preset value R_POWERMUTATION(( ) (where (=0.5) (S610). When the generated value is less than or equal to the preset value R_POWERMUTATION(0.5), one node is selected from one chromosome and a real number arbitrarily generated from [0, maximum power value] is changed into power of the corresponding node (S612). Then, the process proceeds to step S614. When the generated value is greater than the present value (R_POWERMUTATION (0.5)), the process proceeds to step S614.

It is determined if the power based mutation operation is performed on the parent node selected from the first and second parent nodes in step S306, the parent node selected from the third and fourth parent nodes in step S312, and the first and second child nodes created in step S314 (S614). When it is determined that the power based mutation operation is performed on the two parent nodes and the two child nodes, the mutation operation is terminated. When it is determined that the power based mutation operation is not performed, the process returns to step S608.

The order and power based crossover operations of FIG. 5 and the order and power based mutation operations of FIG. 6 are independently performed.

Figure 7:
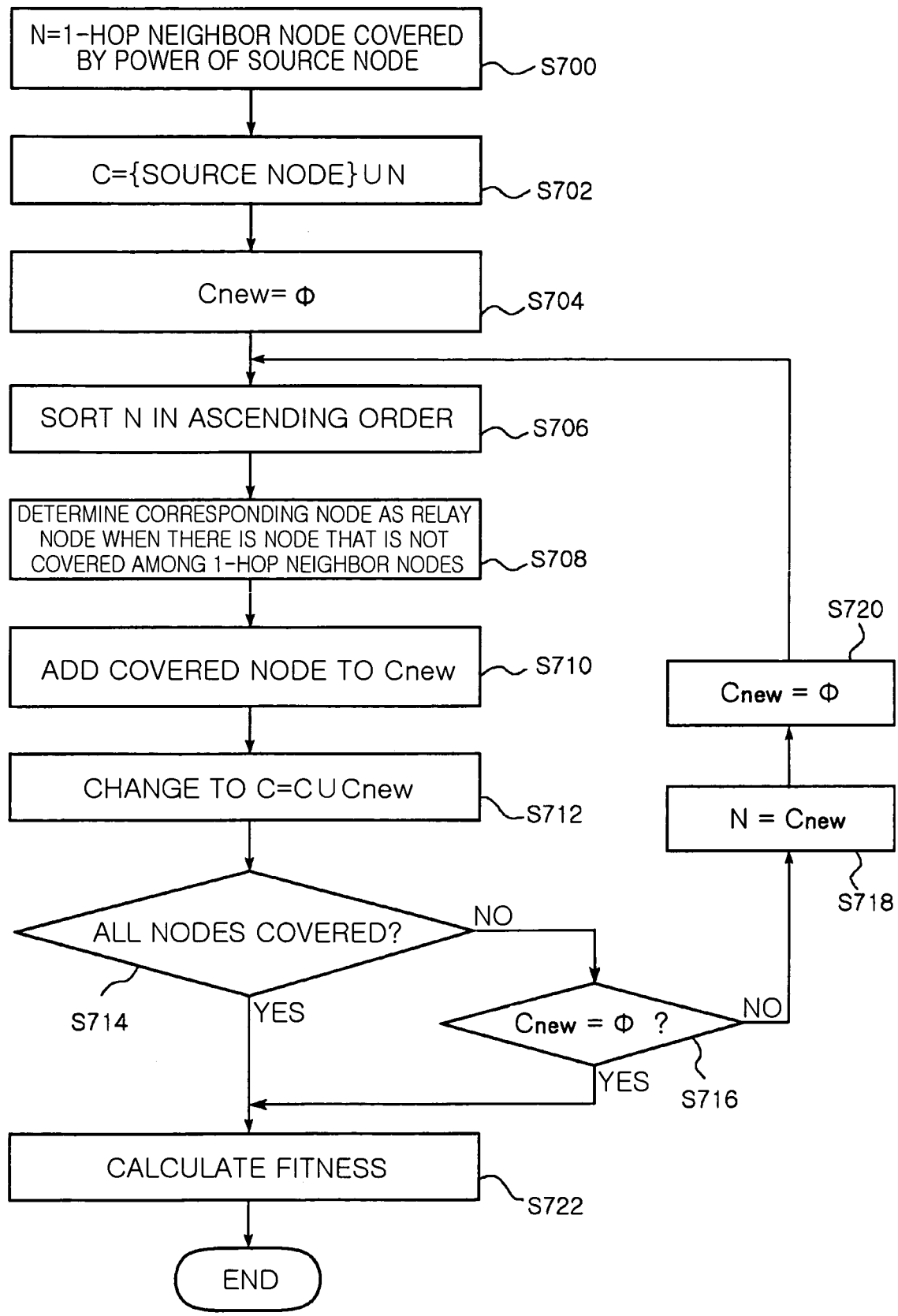
FIG. 7 is a flowchart of an evaluation operation in the genetic algorithm according to an embodiment of the present invention.

FIG. 7 is a flowchart of the evaluation operation applied to the genetic algorithm in the genetic algorithm according to the present invention.

The evaluation operation is to change one chromosome consisting of nodes into broadcast routing tree information in order to select the broadcast routing path by applying the genetic algorithm in the Ad-hoc network. That is, the evaluation operation determines which node is the relay node and how much the relay node dissipates power.

Referring to FIG. 7, a set of 1-hop neighbor nodes that can be covered by the power of the source node is defined as N (S700), and union of the value N and the source node is set as C (S702). That is, C={source node}∪N. A set of new nodes covered by the source is defined as Cnew (Cnew=∅) (S704).

The nodes contained in the N set in one chromosome are sorted in ascending order (S706). It is determined if each sorted node serves as the relay node. When there is a node that is not covered among its own 1-hop neighbor nodes, the corresponding node is determined as the relay node (S708). The nodes that are covered by the relay among the nodes that have not been covered are added to $C_{new}$ (S710).

The C is changed to $C \cup C_{new}$ (S712). The number of nodes that are not covered is counted. When the count value is greater than zero (S714), it is determined if $C_{new}$ is equal to φ (S716). If $C_{new}$ is not equal to φ, N is changed to $C_{new}$ (S718) and $C_{new}$ is set to φ (S720). Then, the process repeats steps S706 to S720 until all nodes are covered.

When the number of nodes that are not covered is not zero in step S714, or when $C_{new}$ is φ in step S718, a fitness is calculated (S722). Then, the process is terminated.

In transmitting data from the source node to the destination node, the optimal order and transmission power are assigned, and it is determined which node is the relay node and how much the relay node dissipates. In this way, the broadcast routing path is selected. According to the present invention, the broadcast routing path can be selected in each node of the network by applying the genetic algorithm to the Ad-hoc network. That is, the broadcast routing can be achieved by connecting all nodes of the network from the source through the relay node.

As described above, each node of the Ad-hoc network is represented by one chromosome, and the relay node is determined by assigning the optimal order and power to the nodes covered from the source to the destination nodes through the crossover and mutation operations considering the order and power of each node. In this way, the data transmission is achieved. Therefore, it is possible to select the path that can minimize the number of the relay nodes and the total power consumption by the broadcast routing in the Ad-hoc network.

In addition, it is possible to select the broadcast routing path so that the resources of the network and nodes can be used maximally.

While the present invention has been described with reference to the particular illustrative embodiments and the accompanying drawings, it is not to be limited thereto but will be defined by the appended claims. It is to be appreciated that those skilled in the art can substitute, change or modify the embodiments into various forms without departing from the scope and spirit of the present invention.

What is claimed is:

1. A method for selecting a broadcast routing path using a genetic algorithm in an Ad-hoc network having a plurality of nodes, comprising the steps of:
   a) defining a plurality of nodes of the Ad-hoc network as one chromosome, and representing the chromosome with pairs of {order, power} in each node;
   b) creating child nodes by performing an order based crossover and a power based crossover with respect to parent nodes neighboring to a source node;
   c) performing a mutation operation with respect to the parent nodes and the child nodes;
   d) determining relay nodes by converting order and power information of each node of the chromosome into routing tree information, and determining power of the relay nodes; and
   e) selecting a broadcast routing path using the number and power of the relay nodes.

2. The method according to claim 1, wherein the step a) further comprises the steps of:
   connecting the nodes of the network to the source node directly or through the relay nodes in order for the broadcast routing; and
   setting a connection order of the nodes and power for data transmission.

3. The method according to claim 1, wherein the connection order is to connecting the nodes to the source node directly or through the relay nodes.

4. The method according to claim 1, wherein the power is energy that is necessary to receive data and transmit the received data in each of the nodes.

5. The method according to claim 1, wherein the step b) comprises the steps of:
   b1) comparing transmission powers of first and second parent nodes neighboring to the source node, and selecting one parent node having a lower transmission power;
   b2) comparing transmission powers of third and fourth parent nodes neighboring to the source node, and selecting one parent node having a lower transmission power; and
   b3) creating first and second child nodes by mutation of the selected parent nodes.

6. The method according to claim 5, further comprising the steps of:
   when transmission power of the first child node is lower than or equal to transmission powers of the first and second parent nodes, determining the parent node having a lower transmission power and the first child node as a next generation pool of the parent nodes;
   when the transmission power of the first child node is greater than the transmission powers of the first and second parent nodes, determining the first and second parent nodes as a next generation pool;
   when transmission power of the second child node is lower than or equal to transmission powers of the third and fourth parent nodes, determining the parent node having a lower transmission power and the second child node as a next generation pool; and
   when the transmission power of the second child node is greater than the transmission powers of the third and fourth parent nodes, determining the third and fourth parent nodes as a next generation pool.

7. The method according to claim 5, wherein the step b3) comprises the steps of:
   generating a value ranging from 0 to 1; and
   when the generated value is less than a preset first reference value (R_ORDERCROSSOVER(0.5)), performing an order-based partially matched crossover (PMX) on the two parent nodes to determine an order value of the first and second child nodes.

8. The method according to claim 5, wherein the step b3) comprises the steps of:
   generating a value ranging from 0 to 1; and
   when the generated value is less than a preset second reference value (R_POWERCROSSOVER(0.5)), performing a power-based blend crossover (BLX) on the two parent nodes to determine a power value of the first and second child nodes.

9. The method according to claim 1, wherein the step c) comprises the steps of:
   c1) changing an order by selecting a pair of nodes from the one chromosome; and
   c2) changing a real number generated from [0, maximum power value] into a power of the node by selecting one node from the one chromosome.

10. The method according to claim 9, wherein the steps c1) and c2) are performed independently.

11. The method according to claim 9, wherein the step c1) comprises the steps of:
    generating a value ranging from 0 to 1; and
    when the generated value is less than a preset third reference value (R_ORDERMUTATION(0.001)), performing an order based mutation operation on the parent nodes and the child nodes.

12. The method according to claim 9, wherein the step c2) comprises the steps of:
    generating a value ranging from 0 to 1; and
    when the generated value is less than a preset fourth reference value (R_POWERMUTATION(0.5)), performing a power based mutation operation on the parent nodes and the child nodes.

13. The method according to claim 1, wherein the step d) comprises the steps of:
    d1) sorting the nodes contained in a set (C) of the nodes covered by power of the source node in ascending order;
    d2) when there are nodes that are not covered among neighbor nodes of the nodes, determining the corresponding nodes as relay nodes;
    d3) adding nodes covered by a relay operation of the determined relay nodes to the set (C); and
    repeating the steps d1) to d3) until all of the nodes of the chromosome are covered.

14. The method according to claim 1, wherein the step e) comprises the steps of:
    e1) calculating number of the relay nodes and power consumption thereof according to the broadcast routing path; and
    selecting a broadcast routing path in which the number of the relay nodes and the power consumption thereof are minimum.

* * * * *